United States Patent [19]
Smith et al.

[11] Patent Number: 6,037,835
[45] Date of Patent: Mar. 14, 2000

[54] MULTI-MODE AUTONOMOUS SELECTION DEMODULATOR

[75] Inventors: Ronald P. Smith, Redondo Beach; Mark Kintis, Manhattan Beach; Harvey L. Berger, Redondo Beach, all of Calif.

[73] Assignee: TRW Inc., Redondo Beach, Calif.

[21] Appl. No.: 09/076,509

[22] Filed: May 12, 1998

[51] Int. Cl.⁷ ................................................. H04N 5/455
[52] U.S. Cl. ...................... 329/316; 375/324; 375/340; 375/343; 455/214; 455/233.1; 348/726
[58] Field of Search .................................. 375/324, 340, 375/343; 455/214, 233.1; 348/726; 329/316

[56] References Cited

U.S. PATENT DOCUMENTS 4,553,251  11/1985  Hartmann .
4,726,040   2/1988  Acampora .
5,757,847   5/1998  Durrant et al. ........................ 375/206

*Primary Examiner*—Arnold Kinkead
*Attorney, Agent, or Firm*—Michael S. Yatsko

[57] ABSTRACT

A method for multi-mode autonomous selection demodulation is disclosed. The method includes the step of providing a receiver with demodulation circuitry (110–112) capable of demodulating a plurality of waveform modulation techniques. The method also includes the step of receiving a modulated information waveform and a preamble associated with the modulated information waveform. The method also includes the steps of matching the preamble against a predefined set of patterns corresponding to a plurality of modulation techniques at the receiver and identifying a corresponding demodulation technique. Additionally, the method configures the demodulation circuitry (110–112) to apply the corresponding demodulation technique to the modulated information waveform.

6 Claims, 1 Drawing Sheet

MULTI-MODE AUTONOMOUS SELECTION DEMODULATOR

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to communications techniques employing modulated waveforms. In particular, the present invention relates to a mechanism by which a receiver may automatically detect and adapt itself to the modulation that a transmitter has applied to generate a modulated information waveform.

Modern communications systems transmit staggering amounts of information. In virtually every instance, the waveform carrying the information is subjected to some form of modulation before transmission, the modulation contains the information and the carrier facilitates the transmission.

Several examples of modulation include Amplitude Modulation (AM), Quadrature Amplitude Modulation (QAM), Frequency Shift Keying (FSK), and Phase Shift Keying (PSK). The various types of modulation, and the various permutations of each type of modulation, are able to support widely differing data rates. For example, Binary PSK (BPSK) generates symbols carrying one bit of information, while Quadrature PSK (QPSK) generates symbols carrying two bits of information and 16-PSK generates symbols carrying four bits of information.

In the interest of efficiently utilizing the available spectrum, it is preferable to send as many bits of information as possible in each symbol. Thus, more expensive, higher data rate transmitters transmit waveforms using the highest order modulation they can handle. In a multi-user system, users may have different data rate requirements and may use different modulations to satisfy their needs. Furthermore, in some circumstances, it may be desirable for higher data rate transmitters to switch to a lower data rate and associated lower order modulation.

As one example, a lower data rate and lower order modulation allows the user to overcome propagation losses due to rain and blockage. Another motivation for a transmitter to adapt its modulation to use a lower data rate and lower order modulation is feedback from the receiver indicating poor channel conditions causing increased bit error rate (BER).

Transmitters generally fall into two classes: those that can only transmit one modulation, and those that may vary their modulation. In order to accommodate transmitters that can vary their modulation, it is generally preferable to enable a receiver to demodulate any of the many types and permutations of modulation that a transmitter may apply to a transmitted waveform. In the past, three general approaches have been used to allow a receiver to demodulate a number of potential modulation schemes.

In the first approach, individual frequency bands are selected from a larger spectrum of available frequencies. The individual frequency bands are then assigned as dedicated channels for each type of modulation that a received waveform may carry. Thus one frequency band may be dedicated to BPSK modulated waveforms, while a separate frequency band may be dedicated to QPSK modulated waveforms. There are many disadvantages to dedicated assignments. For example, a transmitter that needs to switch modulation schemes must make sure that bandwidth is available in the frequency band appropriate for the new modulation. A lack of bandwidth prevents the terminal from adjusting its modulation. Furthermore, dedicated assignments may waste bandwidth by providing capacity that goes unused. Thus, a BPSK frequency band may be underused because transmitters, when possible, transmit in, for example, the QPSK band to achieve higher data rates.

In the second approach, multiple demodulators designed for the various possible modulation formats operate simultaneously on the same frequency bands. These demodulators each have a measure of performance such as detected signal strength or carrier lock. The demodulator with the best performance indicator is selected as being matched to the actual signal. However, this is inefficient due to requiring multiple demodulators with only one producing valid results.

In the third approach, extra hardware, bandwidth, and power are required to enable what is generally referred to as resource control processing. In resource control processing, a receiver is configured with a demodulator that is able to switch between a predefined set of modulation schemes. Alternatively, the receiver may be configured with a set of individual unique demodulators dedicated to specific types of modulation. A required part of resource control processing is overhead control data (i.e., information that cannot be used to transmit user information), to command the demodulator in a receiver to switch demodulation methods or to enable or disable a particular modulation at a transmitting terminal. The overhead control data may be sent by the transmitter, or by another general purpose central control terminal which coordinates the transmitter (and the modulation it uses) and the receiver.

Resource control processing suffers from its own drawbacks, however. For example, useful bandwidth is wasted by sending overhead control data to a receiver (and to the transmitter to command a modulation change). Additionally, the change in modulation at the transmitter and the change in demodulation at the receiver must be synchronized to allow the receiver to accurately demodulate the modulated information waveform. A transmitter may therefore not be able to change the modulation precisely when, or for how long, it would be most efficient or necessary to change the modulation. Lack of, or loss of, synchronization can introduce errors in the demodulated waveform. Errors in the demodulated waveform may create a greater drain on bandwidth, for example if the transmitting terminal has to re-send its information. Furthermore, as noted above, extra hardware is required to process the overhead control data (and to generate the overhead control data in the first place) and adjust the demodulation scheme in the receiver. Extra hardware, of course, requires extra power. Extra power, in turn, is often in short supply, especially on board satellites.

A need has long existed in the industry for a multi-mode autonomous selection demodulator for use in communications equipment.

BRIEF SUMMARY OF THE INVENTION

It is an object of the present invention to allow a receiver to change the demodulation scheme based on a preamble applied to the modulated information waveform.

It is another object of the present invention to eliminate the need for resource control processing.

Yet another object of the present invention is to allow transmitters to change the modulation of a transmitted waveform without undue constraints, such as pre-established synchronization between a transmitter and a receiver.

Another object of the present invention is to reduce the complexity, power dissipation, and cost of a receiver that is able to demodulate multiple modulation schemes.

The invention provides a method for multi-mode demodulation selection, in which a receiver detects the modulation of a modulated information waveform and selects an appropriate demodulation technique. The method includes the steps of providing a receiver with demodulation circuitry capable of demodulating multiple types of modulations. Thus, a receiver may include BPSK, QPSK, and QAM demodulation circuitry. The method also includes the step of receiving a modulated waveform and a preamble associated with the modulated waveform.

The method continues by matching the preamble against a predefined set of patterns that corresponds to multiple of demodulation techniques available at the receiver. A match between the extracted pattern and one of the predefined set bit patterns identifies a demodulation technique corresponding to the modulation on the received modulated information waveform. The demodulation circuitry is then configured to apply the identified demodulation technique to the modulated information waveform to produce a demodulated output.

Alternate methods of detecting the modulation applied to a modulated information waveform are disclosed, including pilot tone analysis and waveform matching.

DETAILED DESCRIPTION OF THE INVENTION

Figure 1:
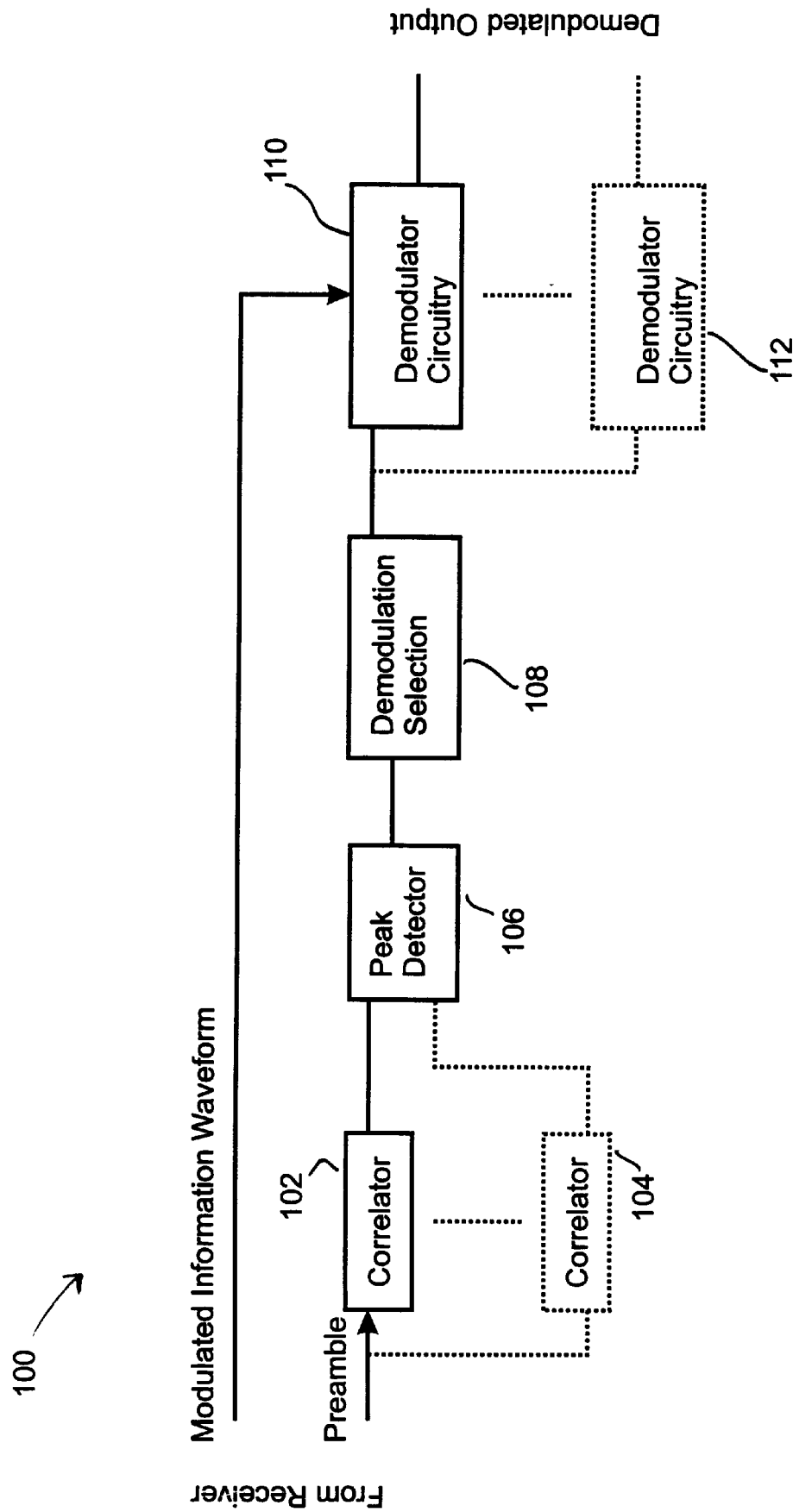
FIG. 1, the sole drawing Figure, illustrates one of many possible embodiments of a multi-mode autonomous selection demodulator.

Turning now to FIG. 1, that figure shows one embodiment of a multi-mode autonomous selection demodulator 100 (hereafter "multi-mode demodulator 100"). The multi-mode demodulator 100 includes a correlator 102 and zero or more optional correlators 104. A peak detector 106 is connected to the correlators 102–104 and demodulation selection circuitry 108 is connected to the peak detector 106. Demodulator circuitry 110, and zero or more optional sets of demodulator circuitry 112 are connected to the demodulation selection circuitry 108 and the original modulated waveform.

In operation, a receiver (not shown) connected to the multi-mode demodulator 100 receives a transmitted signal generally including a preamble and a modulated information waveform. Although the preamble is also modulated, the term "modulated information waveform" as used in this specification refers to the modulated portion of a transmitted signal other than the preamble.

A preamble is a predefined pattern transmitted before the modulated information waveform. A preamble is often present, for example, in Time Division Multiple Access (TDMA) transmission schemes as a required part of each time slot. The predefined pattern present in the preamble is known to the transmitter and the receiver and enables the receiver to synchronize its internal oscillators to those used in the transmitter. Synchronization helps the receiver to accurately demodulate the user information present in the modulated information waveform.

In addition to its synchronization role, the preamble is used in the multi-mode demodulator 100 to provide an indication of the modulation applied to the modulated information waveform. To this end, a subset of the preamble, or the entire preamble itself, may be used as a modulation code to indicate the type of modulation carried by the modulated information waveform. Because a preamble is often a required part of a transmitted signal, embedding a modulation code in the preamble generally adds no extra overhead to the transmitted signal.

In one embodiment of the present invention, a set of patterns known to the transmitters and the receivers defines a number of modulation techniques. For example, 0001 may be used to indicate BPSK, 0011 may indicated QPSK, and 0101 may indicate 16-PSK. The correlator 102 searches the preamble for the modulation code. A single correlator 102 may search for all possible modulation codes by rapidly checking the preamble, or subsets of the preamble, for each bit pattern defining a modulation technique. Alternatively, or additionally, additional correlators 104 may be added, with each of the additional correlators 104 dedicated to detecting a particular modulation code (which, as noted above, may correspond to the entire preamble itself). Suitable correlators include Binary Correlators produced by Harris Semiconductor, 1625 W NASA Boulevard, Melbourne Fla., 32919.

The correlators 102–104 produce an output, referred to as a correlation score, indicative of the degree to which the preamble matches a given bit pattern. The correlation scores are evaluated by the peak detector 106. The peak detector 106 selects the greatest correlation score to determine which correlator, or which bit pattern, has produced the closest match to the modulation code in the preamble. The peak detector 106 communicates the closest match to the demodulation selection circuitry 108. Because the bit patterns (or dedicated correlators) are defined in advance at the transmitter and the receiver to correspond to types of modulation, the demodulation selection circuitry 108 may identify the modulation applied to the modulated information waveform and select an appropriate corresponding demodulation technique.

For example, assuming the peak detector 106 indicates that the modulation code most closely matches the bit pattern assigned to QPSK, the demodulation circuit may select a QPSK demodulation technique. The demodulation selection circuitry 108 communicates the selected demodulation technique to the demodulator circuitry 110. In many instances, the demodulator circuitry 110 may include circuitry that demodulates several different types of modulation and that shares or reuses substantial portions of circuitry between types of modulations. For example, the demodulator circuitry 110 may implement BPSK, QPSK and 16-PSK demodulation circuitry using a common inphase mixer and quadrature mixer and varying only the decoding rule for the resultant inphase and quadrature components. The output of the demodulation selection circuitry 108 may then control the selection of the decoding rule in the demodulator circuitry 110.

Alternatively, or additionally, independent additional demodulators 112 may be added, with each additional demodulator 112 dedicated to demodulating a particular type of modulation. The demodulation selection circuitry 108 may then produce an output enabling a particular set of demodulator circuitry 110–112 and disabling the remaining demodulator circuitry.

Alternatives exist to embedding a modulation code in the preamble. As one example, a pilot tone, consisting of a single frequency, may precede the modulated information waveform in addition to or instead of a preamble. The frequency of the pilot tone may then indicate which type of modulation the transmitter has applied to the modulated information waveform. For example, a 20 KHz pilot tone may indicate BPSK, while a 40 KHz pilot tone may indicate QPSK. The particular frequency of the pilot tone may be detected, for example, by determining the frequency content of a received signal using a Fourier Transform.

As another example, the multi-mode demodulator 100 may implement waveform detection. Thus, instead of a correlator 102, the multi-mode demodulator 100 may instead use a general purpose central processing unit to compare predefined reference waveforms (corresponding to different types of modulation) against a portion of the received signal (for example, the preamble). A match between one of the predefined waveforms may then reveal the type of modulation used on the modulated information waveform portion of the received signal.

The techniques described above allow a transmitter to adjust the modulation applied to the modulated information waveform without the overhead of prior synchronization or resource control processing in general. A transmitter may adapt its modulation technique, knowing that the receiver will be able to autonomously change demodulation schemes by examining the preamble, pilot tone, or by waveform matching.

While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications as incorporate those features which come within the spirit and scope of the invention.

What is claimed is:

1. A method for multi-mode autonomous selection demodulation, comprising:
   a) providing a receiver with a plurality of dedicated demodulators comprising demodulation circuitry capable of demodulating a plurality of waveform modulation techniques;
   b) receiving, at said receiver, a modulated information waveform and a preamble associated with said modulated information waveform;
   c) correlating said preamble against a predefined set of bit patterns corresponding to a plurality of modulation techniques at the receiver and identifying a corresponding demodulation technique; and
   d) configuring said demodulation circuitry by enabling one of said plurality of dedicated demodulators to apply said corresponding demodulation technique to said modulated information waveform.

2. The method of claim 1, wherein said correlating step comprises employing a plurality of correlators individually configured to detect at least one type of modulation.

3. The method of claim 1, wherein said correlating step comprises employing a single correlator that correlates said preamble with said predefined set of bit patterns.

4. A method for multi-mode autonomous selection demodulation, comprising:
   a) providing a receiver with demodulation circuitry capable of demodulating a plurality of waveform modulation techniques;
   b) receiving, at said receiver, a modulated information waveform and a pilot tone associated with said modulated information waveform;
   c) determining a frequency component of said pilot tone and determining a corresponding demodulation technique based on said frequency component;
   d) configuring said demodulation circuitry to apply said corresponding demodulation technique to said modulated information waveform.

5. The method of claim 4, wherein said providing step comprises providing said receiver with a plurality of dedicated demodulators and said configuring step comprises enabling one of said plurality of dedicated demodulators.

6. A method for multi-mode autonomous selection demodulation, comprising:
   a) providing a receiver with a plurality of dedicated demodulators comprising demodulation circuitry capable of demodulating a plurality of waveform modulation techniques;
   b) receiving, at said receiver, a received signal including a modulated information waveform;
   c) matching a portion of said received signal against a predefined set of waveforms corresponding to a plurality of modulation techniques at the receiver and identifying a corresponding demodulation technique; and
   d) configuring said demodulation circuitry by enabling one of said plurality of dedicated demodulators to apply said corresponding demodulation technique to said modulated information waveform.

* * * * *